US012585646B2

(12) United States Patent
Lee et al.

(10) Patent No.: US 12,585,646 B2
(45) Date of Patent: Mar. 24, 2026

(54) INFORMATION PROVISION DEVICE

(71) Applicant: DUNAMU INC., Seoul (KR)

(72) Inventors: Dong Jun Lee, Seoul (KR); Jae Hyuk Kim, Seoul (KR); Hee Soo Park, Seoul (KR); Seok Hyun Hwang, Seoul (KR); Su Jin Park, Seoul (KR); Hyun Ho Jeon, Seoul (KR); Ga Eun Kim, Seoul (KR); Sang Ho Nam, Seoul (KR)

(73) Assignee: DUNAMU INC., Seoul (KR)

( * ) Notice: Subject to any disclaimer, the term of this patent is extended or adjusted under 35 U.S.C. 154(b) by 0 days.

(21) Appl. No.: 18/805,207

(22) Filed: Aug. 14, 2024

(65) Prior Publication Data

US 2025/0165465 A1     May 22, 2025

(51) Int. Cl.
*G06F 16/2452*     (2019.01)
*G06F 16/28*     (2019.01)

(52) U.S. Cl.
CPC ...... *G06F 16/24522* (2019.01); *G06F 16/285* (2019.01)

(58) Field of Classification Search
CPC ............. G06F 16/24522; G06F 16/285; G06F 16/3329; G06F 16/3326; G06F 16/3332; G06F 16/338; G06F 16/35; G06N 3/045; G06N 3/0475; G06N 3/096
See application file for complete search history.

(56) References Cited

U.S. PATENT DOCUMENTS

2021/0081415 A1 *     3/2021     Clarke .............. G06F 16/24534

OTHER PUBLICATIONS

Sun, SQLPrompt: In-Context Text-to-SQL with Minimal Labeled Data, pp. 1-9, Nov. 6, 2023.*
Krause, Proper Generative AI Prompting for Financial Analysis, pp. 1-28, Oct. 27, 2023.*
Liu, Datacentric FinGPT: Democratizing Internet-scale Data for Financial Large Language Models, pp. 1-43, Nov. 14, 2023.*
Raschka, Machine Learning with PyTorch and Scikit-Learn, pp. 1-48, Feb. 2022.*
Thompson, A Brief Understanding of Prompt Engineering, pp. 1-17 Sep. 14, 2023.*
Cortes When, Where, Who, What or Why? A Hybrid Model to Question Answering Systems, p. 136â146, (Year: 2018).*

* cited by examiner

*Primary Examiner* — Albert M Phillips, III
(74) *Attorney, Agent, or Firm* — Perilla Knox & Hildebrandt LLP; Thomas B. Hildebrandt

(57) ABSTRACT
An information provision device comprising: a processor; and a memory operatively coupled to the processor, wherein the memory stores instructions that, when executed, cause the processor to: receive user query data; classify a type of the user query data by using a first language model; generate, based on the classified type, a target prompt being one of a first prompt requesting conversion of the user query data into structured data and a second prompt requesting identification of information related to the user query data based on context data; and provide response data corresponding to the user query data by using the target prompt and a second language model.

18 Claims, 9 Drawing Sheets

100 information provision device 110     120 processor     memory

100 information provision device

110 processor

120 memory

Start receive user query data — S100 classify the type of user query data using first language model — S200 generate target prompt being one of first prompt and second prompt based on the classified type — S300 provide response data corresponding to user query data by using target prompt and second language model — S400

End (a)                    (b)

(c)                                        (d)

INFORMATION PROVISION DEVICE

CROSS-REFERENCE TO RELATED APPLICATION

This application claims priority under 35 U.S.C § 119 to Korean Patent Application No. 10-2023-0163013 filed on Nov. 22, 2023, in the Korean Intellectual Property Office, the entire contents of which are hereby incorporated by reference.

TECHNICAL FIELD

The present disclosure relates to an information provision device and, more particularly, to an information provision device that is capable of providing results by using a language model (e.g., Chat GPT) such as an answer model that can answer questions when providing information.

BACKGROUND

The content described in this section provides background information for this embodiment only and does not constitute prior art.

With the recent emergence of large language models, the use of language models to provide information is increasing. Language models have limitations in that they do not have knowledge after the time of training, so their usability may be somewhat low in areas where real-time information is important (e.g., securities, coins).

Hence, there is a need for a device that can respond to user inquiries by using real-time information.

SUMMARY

An object of the present disclosure is to provide an information provision device that provides information by using a pre-trained language model.

In addition, an object of the present disclosure is to provide an information provision device that enables a pre-trained language model to utilize real-time information.

The objects of the present disclosure are not limited to those mentioned above, and other objects and advantages of the present disclosure that are not mentioned may be understood from the following description and will be more clearly understood from embodiments of the present disclosure. In addition, it will be readily apparent that the objects and advantages of the present disclosure can be realized by the means and combinations thereof indicated in the patent claims.

According to some aspects of the disclosure, an information provision device comprises, a processor, and a memory operatively coupled to the processor, wherein the memory stores instructions that, when executed, cause the processor to: receive user query data, classify a type of the user query data by using a first language model, generate, based on the classified type, a target prompt being one of a first prompt requesting conversion of the user query data into structured data and a second prompt requesting identification of information related to the user query data based on context data, and provide response data corresponding to the user query data by using the target prompt and a second language model.

According to some aspects, the instructions are configured to cause the processor to: determine, based on the user query data being classified as a first type, to provide the response data to the user by using a database inquiry scheme, identify, in response to determining to use the database inquiry scheme, a user query data conversion result obtained from the second language model that converts the user query data into a structured query language statement by inputting the first prompt to the second language model; and identify the response data by searching a database based on the user query data conversion result.

According to some aspects, the instructions are configured to cause the processor to: identify few-shot data related to the user query data whose input frequency is greater than or equal to a reference number of times; and train the second language model based on the few-shot data.

According to some aspects, the instructions are configured to cause the processor to input, upon identifying an error message from the second language model when converting the user query data into a structured query language statement, the user query data in which an error has occurred and error prompt data including the error message to the second language model.

According to some aspects, the instructions are configured to cause the processor to determine to provide the response data to the user based on the second prompt in case that the second language model is identified as being unable to convert the user query data into a structured query language statement.

According to some aspects, the instructions are configured to cause the processor to: determine, based on the user query data being classified as a second type, to provide the response data to the user by using a document-based answer scheme; identify context data related to the user query data in response to determining to use the document-based answer scheme; and obtain the response data for the user query data from the second language model by inputting the second prompt including the context data to the second language model.

According to some aspects, the instructions are configured to cause the processor to identify, based on the user query data being classified as a third type, the response data for the user query data from the second language model by inputting the user query data to the second language model.

According to some aspects, the instructions are configured to cause the processor to: determine whether essential information is included in the user query data; and include a pre-stored field value in the user query data in case of determining that essential information is missing from the user query data.

According to some aspects, wherein the instructions are configured to cause the processor to: request the user to input the essential information in case that it is not possible to include a field value corresponding to the missing essential information in the user query data.

According to some aspects, the instructions are configured to cause the processor to: determine whether essential information is included in the user query data; obtain, in case of determining that essential information is missing from the user query data, a field value for the missing essential information by using a pre-trained deep learning model; and include the field value in the user query data.

Aspects of the disclosure are not limited to those mentioned above and other objects and advantages of the disclosure that have not been mentioned can be understood by the following description and will be more clearly understood according to embodiments of the disclosure. In addition, it will be readily understood that the objects and advantages of the disclosure can be realized by the means and combinations thereof set forth in the claims.

According to the information provision device of the present disclosure, a pre-trained language model may utilize real-time information, thereby increasing the convenience of easily checking provision results.

In addition to the above-described content, specific effects of the present disclosure are described below while explaining specific details for carrying out the disclosure.

DETAILED DESCRIPTION OF THE PREFERRED EMBODIMENTS

Figure 1:
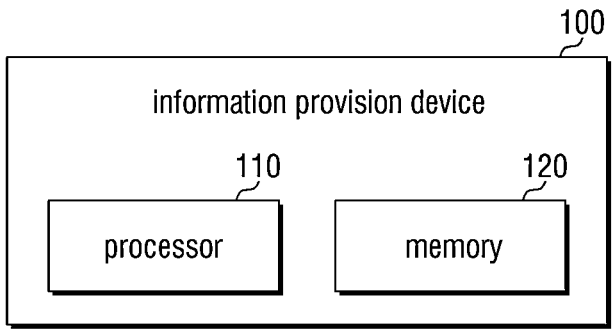
FIG. 1 is a diagram for describing an information provision device according to an embodiment of the present disclosure.

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own inventive concept in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are only used to differentiate one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular forms are intended to include plural forms unless the context clearly indicates otherwise. In the application, terms such as "comprise," "comprise," "have," etc. should be understood as not precluding the possibility of existence or addition of features, numbers, steps, operations, components, parts, or combinations thereof described herein.

Unless otherwise defined, the phrases "A, B, or C," "at least one of A, B, or C," or "at least one of A, B, and C" may refer to only A, only B, only C, both A and B, both A and C, both B and C, all of A, B, and C, or any combination thereof.

Unless being defined otherwise, all terms used herein, including technical or scientific terms, have the same meaning as commonly understood by those skilled in the art to which the disclosure pertains.

Terms such as those defined in commonly used dictionaries should be construed as having a meaning consistent with the meaning in the context of the relevant art, and are not to be construed in an ideal or excessively formal sense unless explicitly defined in the application. In addition, each configuration, procedure, process, method, or the like included in each embodiment of the disclosure may be shared to the extent that they are not technically contradictory to each other.

Hereinafter, an information provision device according to an embodiment of the present disclosure will be described with reference to FIGS. 1 to 9.

Figure 2:
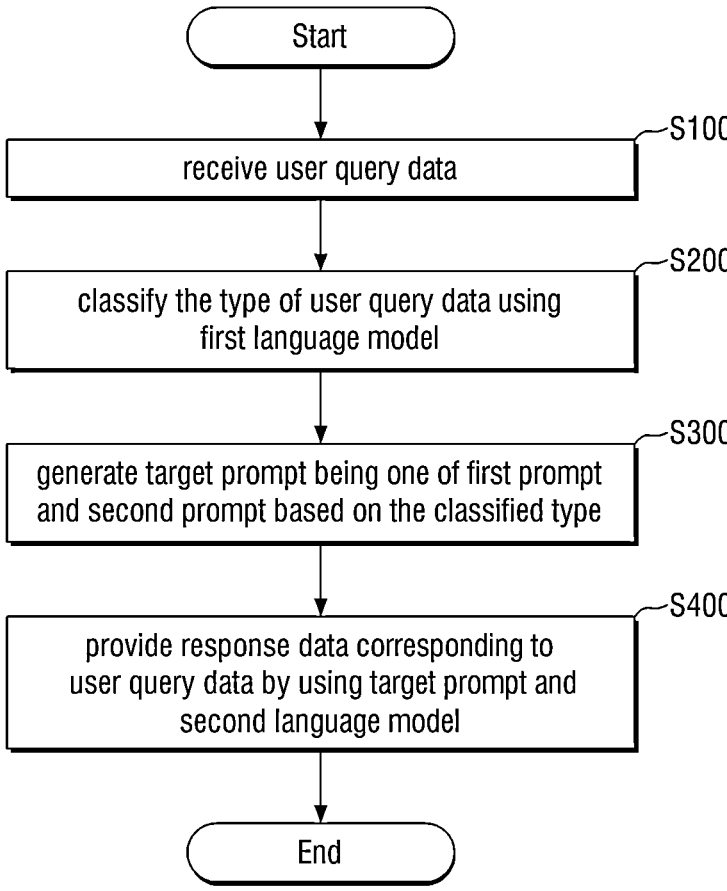
FIG. 2 is a diagram for describing the operation of the processor in FIG. 1.
Figure 3:
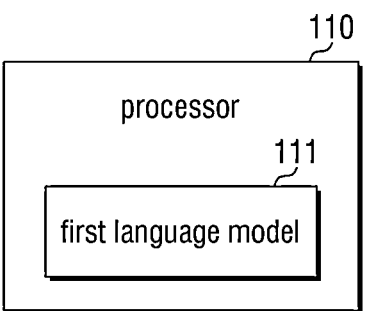
FIG. 3 is a diagram for depicting the processor of the information provision device according to an embodiment of the present disclosure.

FIG. 1 is a diagram for describing an information provision device according to an embodiment of the present disclosure. FIG. 2 is a diagram for describing the operation of the processor in FIG. 1. FIG. 3 is a diagram for depicting the processor of the information provision device according to an embodiment of the present disclosure.

With reference to FIGS. 1, 2 and 3, the information provision device 100 according to an embodiment of the present disclosure may include a processor 110 and a memory 120.

One or more other components (e.g., communication module) may be added to the information provision device 100. In a certain embodiment, some of these components may be implemented as a single integrated circuit.

The memory 120 may store various data used by at least one component (e.g., processor 110) of the information provision device 100. Data may include, for example, software (e.g., programs), and input data or output data for instructions related thereto. The memory 120 may include a volatile memory or a non-volatile memory.

The memory 120 may store instructions, information, or data related to the operation of the components included in the information provision device 100. For example, the memory 120 may store instructions that, when executed, enable the processor 110 to perform various operations described in this document.

The processor 110 may be operatively coupled with the memory 120 to perform the overall functions of the information provision device 100. The processor 110 may include, for example, one or more processors. The one or more processors may include, for example, an image signal processor (ISP), an application processor (AP), or a communication processor (CP).

The processor 110 may execute, for example, software (e.g., program) so as to control at least one other component (e.g., hardware or software component) of the information provision device 100 connected to the processor 110 and perform various data processing or calculations. According to one embodiment, as at least part of data processing or computation, the processor 110 may load commands or data received from another component (e.g., communication module) into the memory 120, process commands or data stored in the memory 120, and store the resulting data in the memory 120. According to one embodiment, the processor 110 may include a main processor (e.g., central processing unit or application processor) and an auxiliary processor that may operate independently of or together with the main processor (e.g., graphics processing unit, image signal processor, sensor hub processor, or communication processor). Additionally or alternatively, the auxiliary processor may be configured to use less power than the main processor or to specialize in designated functions. The auxiliary processor may be implemented separately from or as part of the main processor. Programs may be stored as software in the memory 120 and may include, for example, an operating system, middleware, or applications.

The processor 110 may receive user query data (S100). The processor 110 may receive user query data including a query from the outside (e.g., user).

The processor 110 may classify the type of user query data by using a first language model (S200). In one embodiment, when the user query data is query data based on database inquiry, the user query data may be classified into a first type. In this case, the database may be one of a relational database, an object oriented database, or a non-relational database, but without being limited thereto, and may be of various forms that may be adopted by a person skilled in the art, such as a document oriented-database or NewSQL database. For example, to provide response data to the user query data, if data including market prices for specific items (e.g., stocks, companies, etc.) or financial statements related to the content contained in the user query data is required, the processor 110 may classify the user query data as the first type.

In one embodiment, when the user query data is document-based query data, the user query data may be classified as a second type. For example, if document data or public announcement data related to news is needed to provide response data to the user query data, the processor 110 may classify the user query data as the second type.

For example, if data on the trained content of the language model is needed to provide response data to the user query data, the processor 110 may classify the user query data as a third type. In one embodiment, if the user query data is not classified into the first type or the second type, the processor 110 may classify the user query data as the third type. In another embodiment, if the user query data is classified as a category different from the first type or the second type, the processor 110 may classify the user query data as the third type. The processor 110 may classify or cluster user query data by using a first language model to be described later. As a result of classification or clustering using the first language model, if the user query data is not classified as a cluster corresponding to the first type or second type being a pre-selected category, or is classified as a cluster different from the first type or second type, the processor 110 may identify the corresponding user query data as the third type.

In another embodiment, the processor 110 may classify the user query data as the third type in response to an occurrence of a specific event even when the user query data has been classified as the first type or the second type. For example, after classifying the user query data as the first type or the second type, the processor 110 may obtain response data by using a method to be described later. If the suitability of the obtained response data is low, the processor may classify the user query data as the third type and identify new response data. The cases where the suitability of the response data is low may include one of a case where a negative feedback signal regarding the response data is received from the user, a case where the response data contains an error message, and a case where the accuracy of the response data is determined to be low based on the result data of a model that evaluates the accuracy of the response data; without being limited thereto, if the obtained response data cannot be used or needs to be modified, the user query data may be classified as the third type. In one embodiment, the processor 110 may determine the suitability or accuracy of response data by using a reward model. More specific details about the reward model will be described later.

In some embodiments, the processor 110 may include a first language model 111. The first language model 111 may identify the type of user query data based on the type of data used to provide response data to the user query data. The operation described as the operation of the first language model 111 may be implemented as instructions that may be performed (or executed) by the processor 110.

For example, the first language model 111 may classify the user query data into at least one type. The types may be classified depending on, for example, which data is advantageous for providing response data to the user query data. For example, for the individual cases where the user query data is related to market prices or financial statements, where the user inquiry data is related to news or public announcements, and where the user query data may be answered when input to a language model (e.g., Chat GPT, etc.), the first language model 111 may identify different types of user query data. In some embodiments, the classification model may be an artificial neural network model that classifies user query data based on pre-specified categories; in some other embodiments, the classification model may classify the above-described user query data by clustering similar user query data without a specified category. Without being limited thereto, the classification model may be an artificial neural network classification model that may be selected or modified by a person skilled in the art.

In FIG. 3, the processor 110 is shown as including the first language model 111, but is not limited thereto. The processor 110 may identify the type of user query data by communicating with the first language model 111 present in the outside.

The processor 110 may generate a target prompt among a first prompt and a second prompt based on the classified type (S300). The first prompt may include content requesting conversion of the user query data into structured data. The second prompt may include content requesting identification of information related to the user query data on context data. The processor 110 may provide response data corresponding to the user query data by using the target prompt and the second language model (S400).

In one embodiment, the second language model may be in the form of a decoder-based artificial neural network model of a transformer model. In another embodiment, the second language model may be in the form of an encoder-based artificial neural network model of a transformer model. In another embodiment, the second language model may be a generative artificial neural network model based on the encoder and decoder of a transformer model. Without being limited thereto, the second language model may be in the form of a generative artificial neural network model based on a large language model (LLM), which may be selected and modified by a person skilled in the art. In one embodiment, if the second language model is based on a transformer model, the second language model may output long response data by using an attention mechanism.

For example, based on the classified type, the processor 110 may identify the scheme to be used for providing information provision results to the user among a database inquiry scheme related to the first prompt, a document-based answer scheme related to the second prompt, and a pre-trained language model usage scheme. The database inquiry scheme, the document-based answer scheme, and the pre-trained language model usage scheme may each be methods of identifying response data by using a language model through different processes. Each scheme and provision of response data will be described with reference to FIGS. 4A, 4B, 5A, 5B, 6A, and 6B.

Figure 4A:
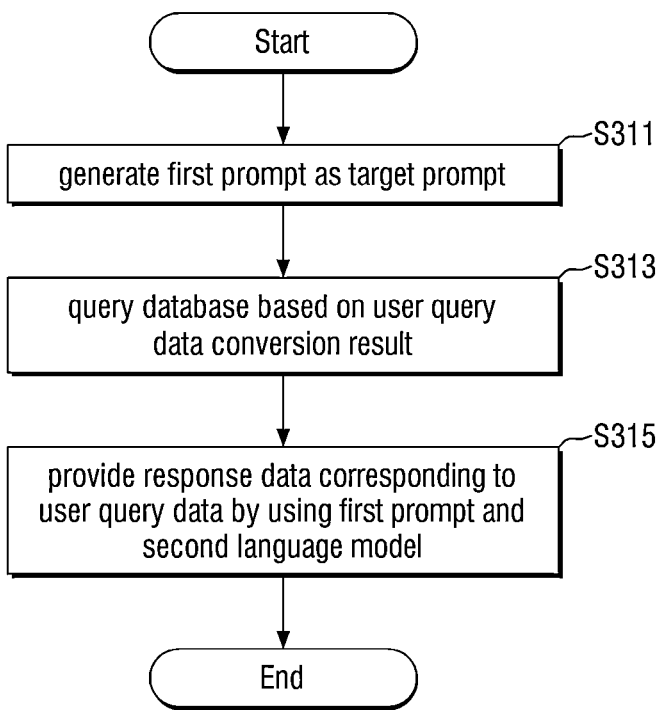
FIG. 4A is a diagram for describing the operation of the processor according to an embodiment of the present disclosure.
Figure 4B:
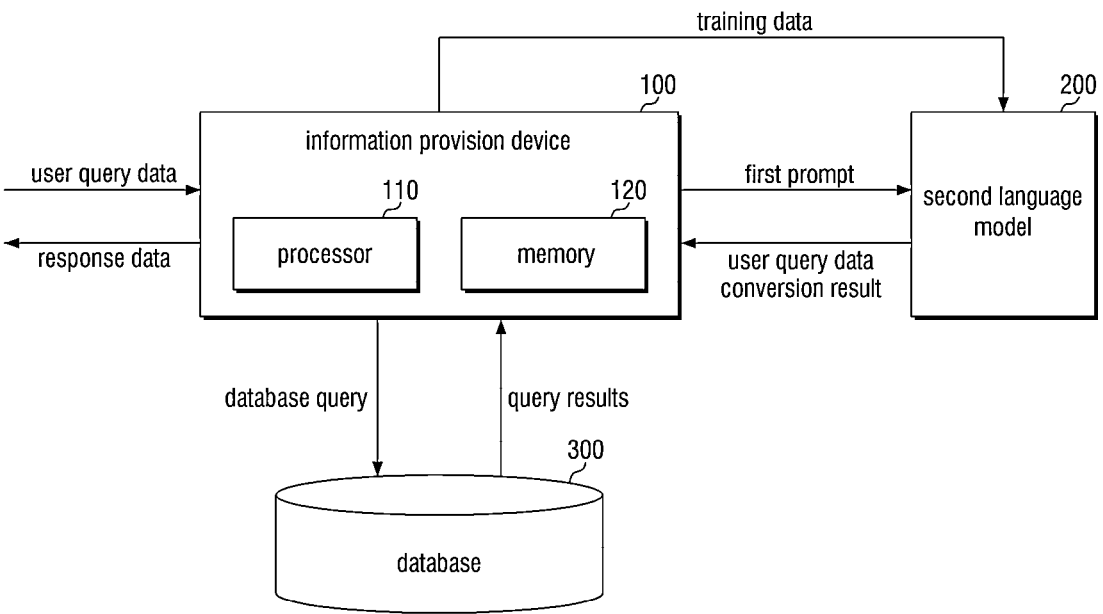
FIG. 4B is a diagram for depicting the operation of the information provision device of FIG. 4A.

FIG. 4A is a diagram for describing the operation of the processor according to an embodiment of the present disclosure. FIG. 4B is a diagram for depicting the operation of the information provision device of FIG. 4A.

With reference to FIGS. 4A and 4B, the processor 110 may provide response data to the user based on a database inquiry scheme according to the user query data being classified as the first type. The processor 110 may generate the first prompt as a target prompt to provide response data to the user by using a database inquiry scheme.

For example, if the user query data is "tell me the five stocks that rose the most today", based on the need for data containing market prices of specific items (e.g., stocks, companies, etc.) to provide response data to the user query data, the processor 110 may classify the user query data as the first type, generate the first prompt, and then determine to identify the response data based on a database inquiry scheme.

The processor 110 may generate the first prompt as a target prompt (S311). The processor 110 may input the first prompt containing a request to convert the user query data into structured data to the second language model 200. The second language model 200 is a pre-trained language model and may be a model for providing an answer to user query data. Based on the first prompt, the processor 110 may receive a user query data conversion result obtained by converting the user query data into a structured query language statement from the pre-trained second language model 200.

For example, for user query data "tell me the five stocks that rose the most today", the processor 110 may identify the result obtained by the second language model 200 that converts the user query data into a structured query language statement (e.g., SELECT name, daily_change_rate FROM stock_quote WHERE date=CURDATE ( ) ORDER BY daily_change_rate DESC LIMIT 5;) as the user query data conversion result.

The processor 110 may query the database 300 based on the user query data conversion result (S313). The processor 110 may provide response data corresponding to the user query data by using the first prompt (i.e., target prompt) and the second language model 200 (S315). For example, the processor 110 may provide response data to the user based on the query results of the database 300 (S315).

For example, for the user query data "tell me the five stocks that rose the most today", the processor 110 may provide response data as shown in Table 1 below to the user by using the second language model 200.

TABLE 1

| Item name | Price-earnings ratio |
| --- | --- |
| Item1 | 30.0% |
| Item2 | 29.5% |
| Item3 | 23.2% |
| Item4 | 11.1% |
| Item5 | 5.6% |

In some embodiments, the query results may be the same as the response data.

The database 300 may include specific data (e.g., stock prices or company financial statements, etc.). The specific data may be updated to the database 300 in real time or periodically by the processor 110.

In the information provision device 100 according to an embodiment of the present disclosure, through the database 300 being updated in real time or periodically, the processor 110 may provide response data including real-time information as to user query data by using the second language model 200.

The processor 110 may retrain the second language model 200 by using training data including query results of the database 300 for the user query data, response data based on the query results, and the user query data. The query results of the database 300 may include information about the structure of the database 300. For example, the query results may include information about attribute values, column values, row values, and fields.

For the second language model 200 to convert the user query data into a structured query language statement, the processor 110 may provide the first prompt to the second language model 200. The second language model 200 may convert the user query data into a structured query language statement based on the first prompt and generate a user query data conversion result. The prompt for a structured query language statement may include, for example, content regarding real-time data (e.g., real-time market price, highest price, or the like for stocks) with respect to the date on which the user query data is received. Or, if the user query data is related to financial statements, the prompt for a structured query language statement may include, for example, content regarding whether being quarterly, sales, operating profits, or the like.

In some embodiments, the processor 110 may provide a prompt to the pre-trained second language model 200 to perform few-shot learning. In one embodiment, the processor 110 may enable the second language model 200 to perform reinforcement learning. In this case, the processor 110 may enable the second language model 200 to perform reinforcement learning based on previously generated prompts and response data sets. In some embodiments, the processor 110 may identify an evaluation model (not shown) for response data generated from the second language model 200 described above. In this case, the processor 110 may use the evaluation model to evaluate the suitability or accuracy of the response data from the second language model 200 described above.

In some other embodiments, the processor 110 may enable the second language model 200 to perform zero-shot learning without a prompt. In this embodiment, the second language model 200 may identify a type of user query data that it has not been previously trained on.

In some embodiments, the processor 110 may identify user query data whose input frequency is greater than or equal to a reference number of times. For example, user query data containing important questions or user query data containing frequently asked questions may be identified.

The processor 110 may identify few-shot data related to user query data whose input frequency is greater than or equal to the reference number of times. The processor 110 may additionally train the pre-trained second language model 200 based on the few-shot data.

For example, the processor 110 may identify few-shot data including user query data and a result of providing information as to the user query data. For example, the processor 110 may input, to the second language model 200, few-shot data including user query data "how much did stock A rise last Thursday? (today's date is 00-00-00 in yr-mm-dd)", and an answer including the daily change in stock A's price, stock A's name, and the date the user asked the question. For example, the processor 110 may input, to the second language model 200, few-shot data including user query data "tell me the sales of company B over the past five years. (today's date is 00-00-00 in yr-mm-dd)", and an answer including company B's financial conditions and sales volumes.

The processor 110 may selectively extract few-shot data related to user query data and input it to the second language model 200. For example, the processor 110 may receive information about few-shot data from the outside. Alternatively, for example, the processor 110 may generate few-shot data by using an appropriate algorithm and input it to the second language model 200.

The information provision device 100 according to an embodiment of the present disclosure may lower the possibility of errors occurring when converting user query data into a structured query language statement by additionally training the second language model 200.

In some embodiments, the processor 110 may identify a case in which an error has occurred when the second language model 200 converts user query data into a structured query language statement. Upon identifying an error message from the second language model 200, the processor 110 may input, to the second language model 200, error prompt data including the user query data in which an error has occurred and the error message. Based on the error prompt data, the processor 110 may deliver, to the second language model 200, a request for rewriting the structured query language statement, where the request contains information about whether an error has occurred in specific user query data, the user query data, and the error that has occurred. The processor 110 may receive a rewritten user query data conversion result from the second language model 200.

In some embodiments, upon identifying that it is not possible for the pre-trained second language model 200 to convert the user query data into a structured query language statement, the processor 110 may provide response data based on the second prompt. For example, the processor 110 may determine to provide response data to the user based on a document-based answer scheme. For example, if an error occurs more than a specified number of times for specific user query data, the processor 110 may determine that it is not possible to convert the user query data into a structured query language statement. The document-based answer scheme will be described below with reference to FIGS. 5A and 5B.

Figure 5A:
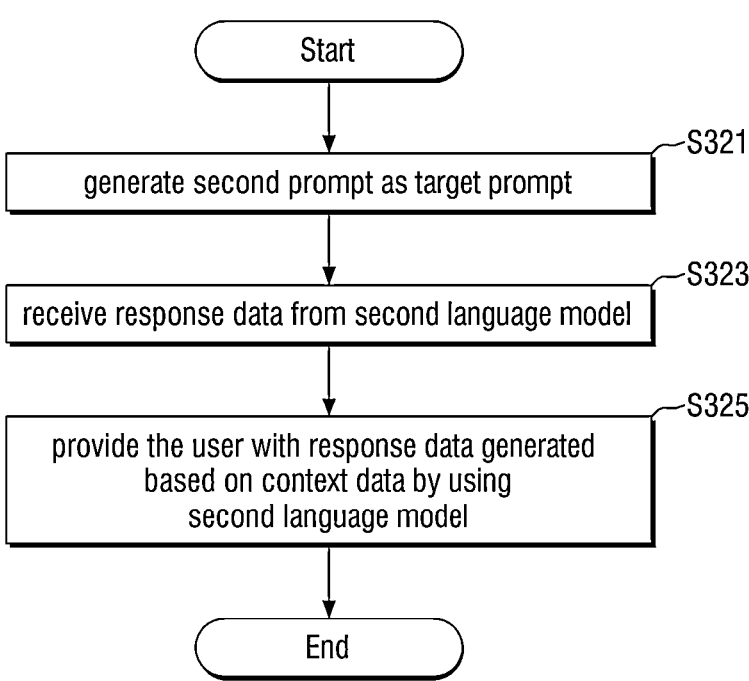
FIG. 5A is a diagram for describing the operation of the processor according to an embodiment of the present disclosure.
Figure 5B:
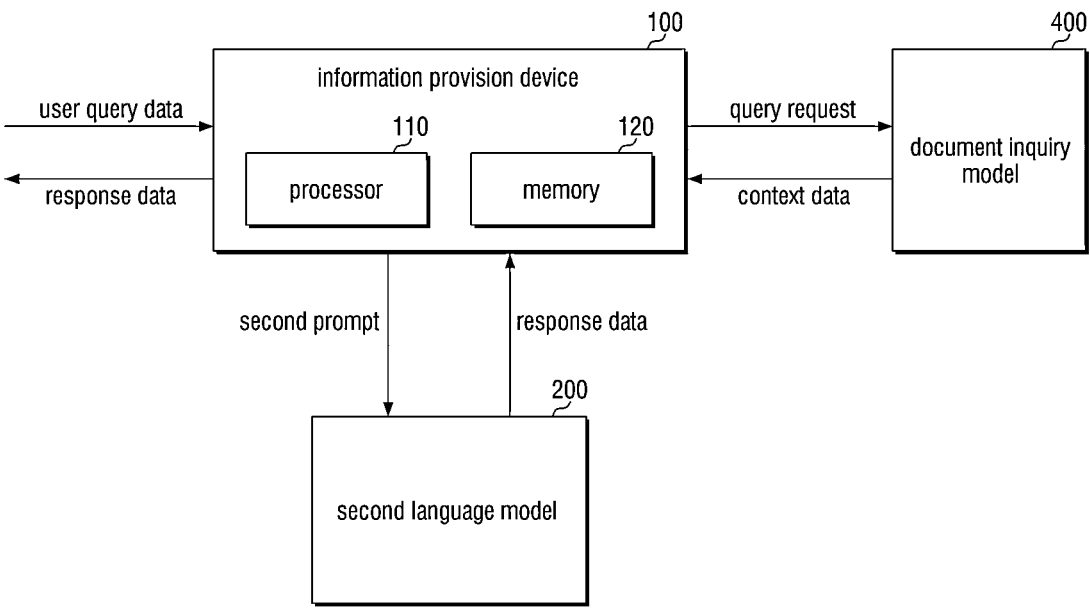
FIG. 5B is a diagram for depicting the operation of the information provision device of FIG. 5A.

FIG. 5A is a diagram for describing the operation of the processor according to an embodiment of the present disclosure. FIG. 5B is a diagram for depicting the operation of the information provision device of FIG. 5A.

With reference to FIGS. 5A and 5B, based on the user query data being classified as the second type, the processor 110 may provide response data to the user by using a document-based answer scheme. The processor 110 may generate the second prompt as a target prompt to provide response data to the user by using a document-based answer scheme.

For example, if the user query data is "why did company A's stock rise today?", based on the need for news or public announcements to provide response data to the user query data, the processor 110 may classify the user query data as the second type, generate the second prompt, and then determine to identify the response data based on a document-based answer scheme.

The processor 110 may generate the second prompt as the target prompt (S321). The processor 110 may generate the second prompt including a request for identifying information related to the user query data on the context data. The processor 110 may identify context data related to user query data by using a document inquiry model 400. Context data may include, for example, news or public announcements. The processor 110 may update news or public announcements in real time or periodically in a database that the document inquiry model 400 may query.

For example, the processor 110 may use the document inquiry model 400 to search for at least one news article related to the user query data "why did company A's stock rise today?".

The processor 110 may input the second prompt to the pre-trained second language model 200 and receive response data from the second language model 200 (S323). The processor 110 may input context data to the second language model 200, which enables the second language model 200 to generate response data that answers the user query data within the context data.

For example, the processor 110 may provide the second prompt, which includes information about at least one news article retrieved in relation to the user query data "why did company A's stock rise today?", to the second language model 200. More specifically, the processor 110 may identify the second prompt for requesting generation of contexts related to company A's stock prices from information about the news article, and obtain response data by inputting the identified second prompt to the second language model 200 being a text generation model.

The processor 110 may provide response data generated based on context data to the user by using the second language model 200 (S325).

For example, for the user query data "why did company A's stock rise today?", the processor 110 may provide information based on at least one news article as response data by using the second language model 200. More specifically, the second language model 200 may identify the above-described response data by performing text analysis (analyze texts) and knowledge-based text generation (answer questions about a knowledge base) based on the input data.

In some embodiments, the processor 110 may provide the second prompt to the second language model 200 so that the second language model 200 may generate response data based on context data for the user query data. Based on the second prompt, the second language model 200 may generate response data that is an answer to the user query data according to the context data. The prompt for an answer based on context data may include, for example, news or public announcement content, and may include a request to answer the user query data by referring to the news or public announcement content.

Figure 6A:
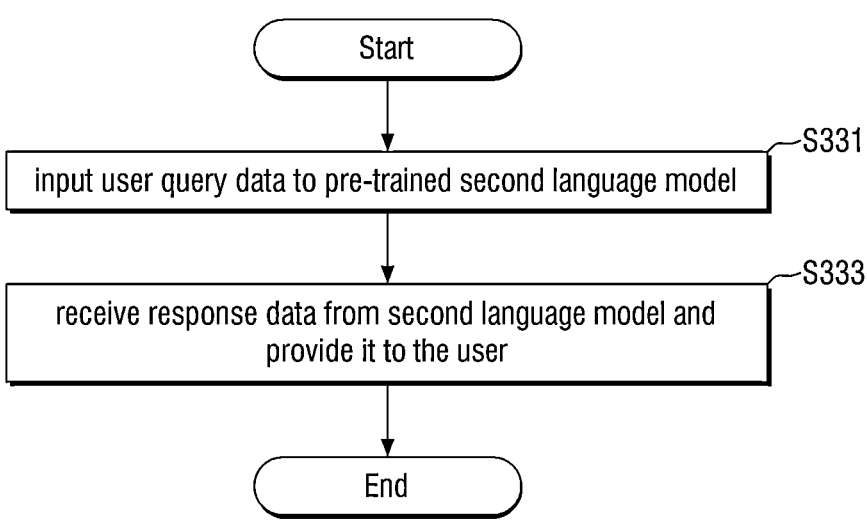
FIG. 6A is a diagram for describing the operation of the processor according to an embodiment of the present disclosure.
Figure 6B:
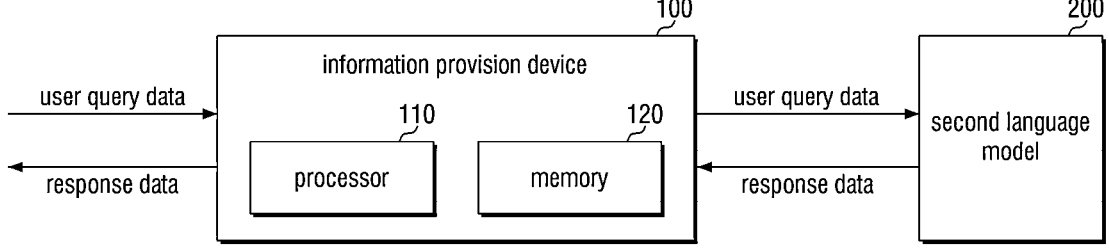
FIG. 6B is a diagram for depicting the operation of the information provision device of FIG. 6A.

FIG. 6A is a diagram for describing the operation of the processor according to an embodiment of the present disclosure. FIG. 6B is a diagram for depicting the operation of the information provision device of FIG. 6A.

Referring to FIGS. 6A and 6B, based on user query data being classified as the third type, the processor 110 may provide response data to the user according to a scheme using the pre-trained second language model.

Upon determining that it is advantageous to directly input the user query data to the second language model 200 and receive response data from the second language model 200, the processor 110 may input the user query data to the pre-trained second language model 200 (S331). The cases of determining that it is advantageous to input user query data into the second language model 200 and receive response data from the second language model 200 may include, for example, a case where access to the database 300 or the document inquiry model 400 is determined to be unnecessary. Alternatively, if the classification result of the user query data does not belong to pre-specified classification categories, the processor 110 may directly input the user query data to the second language model 200.

The processor 110 may receive response data from the pre-trained second language model 200 and provide it to the user (S333). In some embodiments, the response data may be provided directly to the user from the second language model 200 without going through the processor 110.

Figure 7:
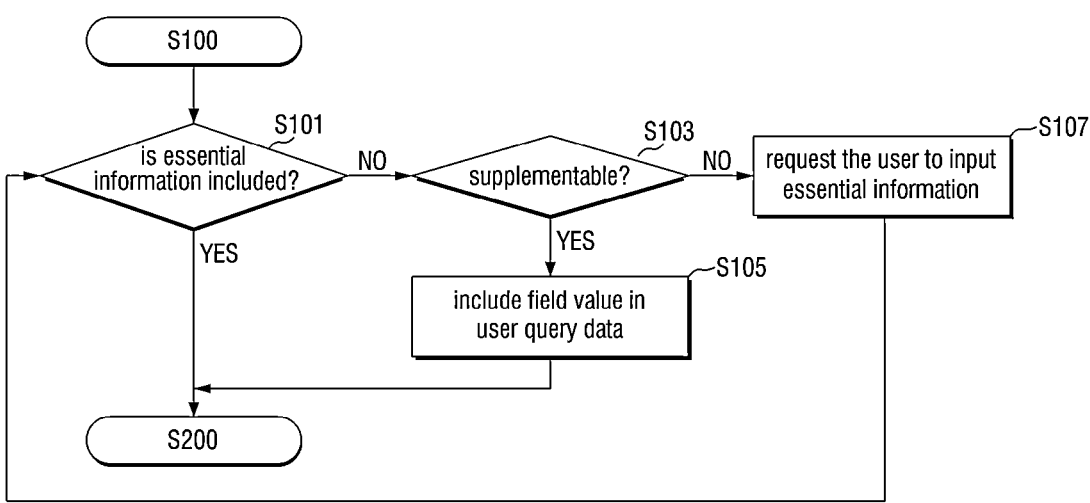
FIG. 7 is a diagram for describing the operation of the information provision device according to an embodiment of the present disclosure.

FIG. 7 is a diagram for describing the operation of the information provision device according to an embodiment of the present disclosure.

With reference to FIG. 7, the processor 110 may perform preprocessing on the user query data. When the user query data is received (S100), the processor 110 may determine whether the user query data includes essential information (S101). The essential information may include, for example, the date on which the user query data is received.

If essential information is included in the user query data (YES at S101), the processor 110 may perform step S200 in FIG. 2.

If essential information is not included in the user query data (NO at S101), the processor 110 may determine whether the essential information missing from the user query data can be supplemented (S103). The processor 110 may determine whether supplementation is possible based on, for example, the type of the missing essential information. For example, if the missing essential information is a date, as the current date can be identified, the processor 110 may determine that the essential information may be supplemented. For example, if the missing essential information is item information, since the item is not known for which the response data should be provided, the processor 110 may determine that the essential information cannot be supplemented.

If the essential information missing from the user query data can be supplemented (YES at S103), the processor 110 may include a pre-stored field value in the user query data. For example, if the date being essential information is missing from the user query data, the current date on which the user query data is received may be included in the user query data. The processor 110 may perform step S200 in FIG. 2 based on the supplemented user query data.

If the essential information missing from the user query data cannot be supplemented (NO at S103), the processor 110 may request the user to input the essential information (S107). The cases where essential information missing from the user query data cannot be supplemented may be, for example, a case where a pre-stored field value corresponding to the essential information cannot be identified or a case where a field value cannot be included.

In some embodiments, the processor 110 may use a pre-trained deep learning model to determine whether essential information is missing from the user query data. The processor 110 may include a field value corresponding to the missing essential information in the user query data and perform step S200 in FIG. 2 based on the supplemented user query data.

In some embodiments, upon determining that essential information is missing from the user query data, the processor 110 may estimate a field value corresponding to the missing essential information by using a pre-trained deep learning model. The processor 110 may include the estimated field value in the user query data and perform step S200 in FIG. 2 based on the supplemented user query data. In some embodiments, the processor 110 may further perform a step of receiving user feedback information as to the estimated field value. In this case, the processor 110 may additionally include the user feedback information as to the estimated field value in the user query data and perform step S200 in FIG. 2 based on the additionally supplemented user query data.

The information provision device 100 according to an embodiment of the present disclosure may select a scheme for providing response data to user inquiry data according to the user inquiry data, so that the accuracy and reliability of response data to user inquiry data can be improved, and response data including real-time information can be provided.

Figure 8:
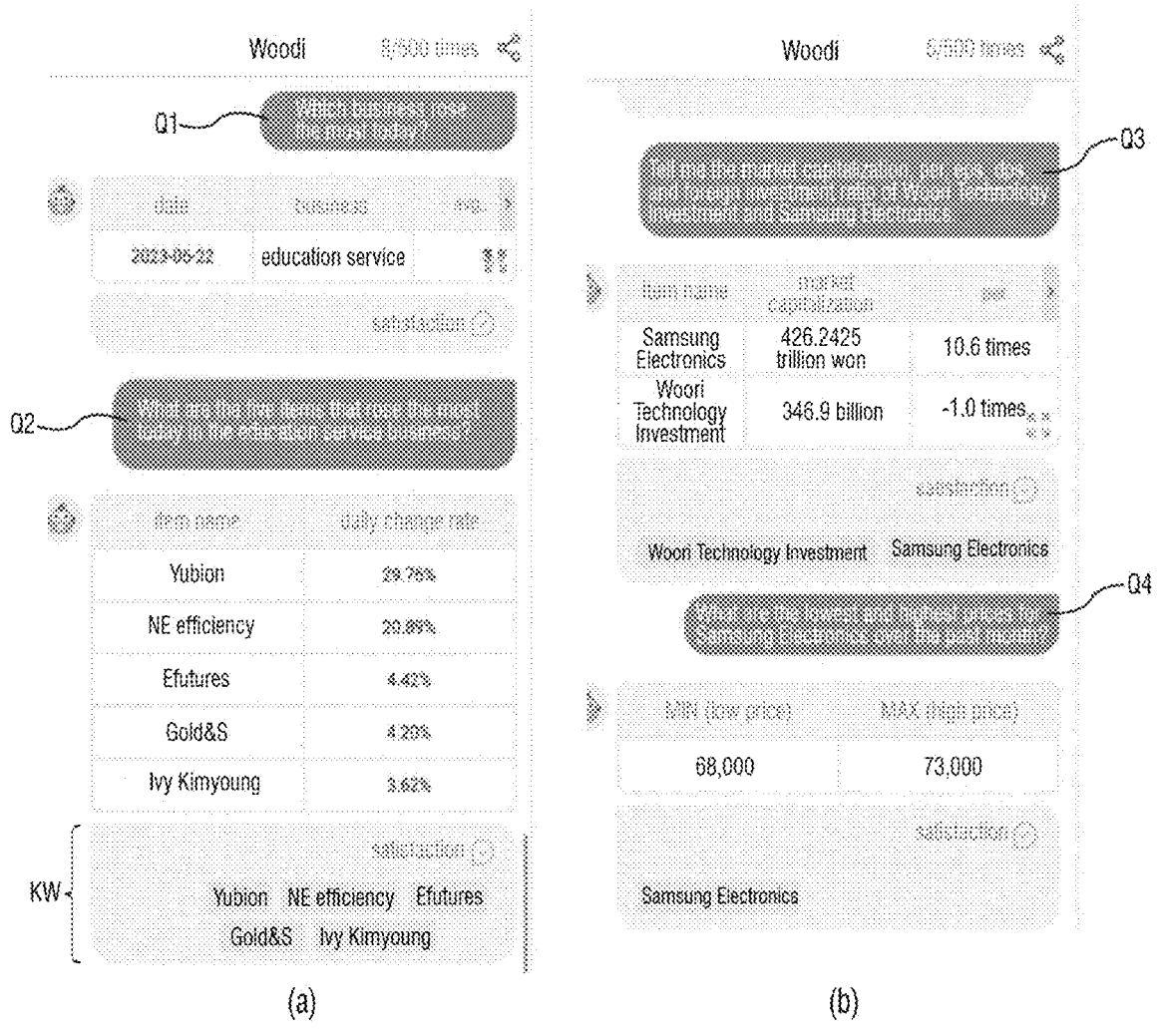
FIG. 8 is a diagram for describing how the information provision device provides information provision results according to an embodiment of the present disclosure.

FIG. 8 is a diagram for describing how the information provision device provides information provision results according to an embodiment of the present disclosure.

With reference to FIG. 8, when the user query data is classified as the first type, the processor 110 may enable the user to easily identify market prices or financial information by using a database inquiry scheme, and may enable the user to screen items based on market prices or financial information.

Referring to a first interface (a) in FIG. 8, the processor 110 may classify first user query data (Q1) and second user query data (Q2) as the first type related to market prices, and provide the user with response data including at least one of today's date, item name, business name, and change rate by using a database inquiry scheme. At this time, the response data may include real-time information. The information provision device according to an embodiment of the present disclosure may provide real-time information to the user by using a language model.

In some embodiments, the processor 110 may display related search words (KW) associated with the user query data on the first interface (a).

Referring to a second interface (b) in FIG. 8, the processor 110 may classify third user query data (Q3) as the first type related to financial statements, and provide response data to the user by using a database inquiry scheme. The processor 110 may classify fourth user query data (Q4) as the first type related to market prices, and provide response data to the user by using a database inquiry scheme. When stored data needs to be searched, the processor 110 may provide response data by querying a database, thereby securing the reliability of the response data.

Figure 9:
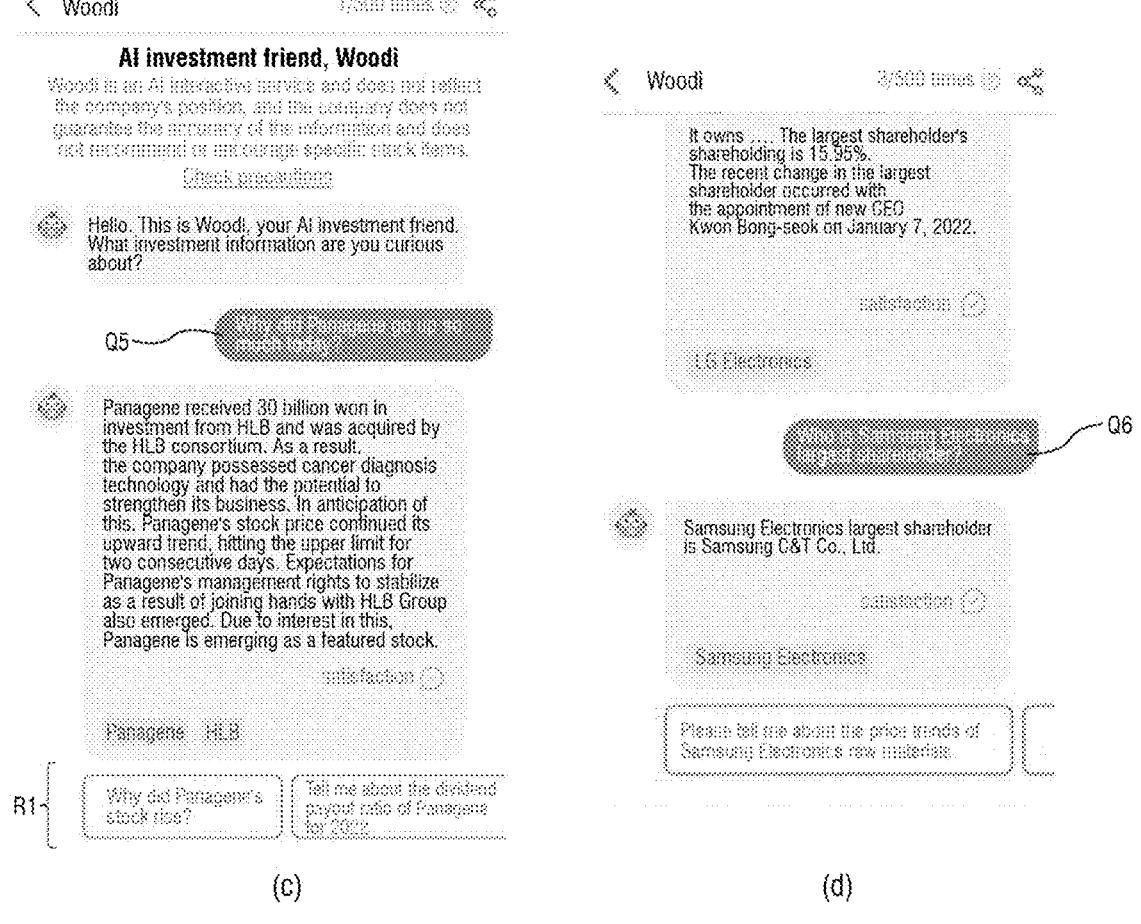
FIG. 9 is a diagram for describing how the information provision device provides information provision results according to an embodiment of the present disclosure.

FIG. 9 is a diagram for describing how the information provision device provides information provision results according to an embodiment of the present disclosure.

With reference to FIG. 9, based on the user query data being classified as the second type, response data is provided by using a document-based answer scheme, so that it is possible to provide necessary information to the user by selectively collecting information needed for the user query data from a vast amount of news and public disclosure documents, and real-time issues can be quickly delivered through fulfillment of real-time information retrieval.

Referring to a third interface (c) in FIG. 9, the processor 110 may classify the fifth user query data (Q5) as the second type in need of news search, and provide response data including real-time news search results to the user by using a document-based answer scheme.

In some embodiments, the processor 110 may display recommended questions (R1) related to the user query data on the third interface (c). In some other embodiments, the processor 110 may supplement the user query data and display it on the third interface (c).

Referring to a fourth interface (d) in FIG. 9, the processor 110 may classify the sixth input (Q6) as the second type in need of public document search, and provide reliable response data to the user by using a document-based answer scheme.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the embodiments be considered in all respects as illustrative and not restrictive, reference being made to the appended claims rather than the foregoing description to indicate the scope of the disclosure.

What is claimed is:

1. An information provision device for processing user query data received from a user terminal, comprising:

a processor; and a memory operatively coupled to the processor, wherein the memory stores instructions that, when executed, cause the processor to at least:

receive the user query data;

classify a type of the user query data by using a first language model based at least in part on selecting between a first type, a second type, and a third type, the first type corresponding to a database inquiry type, the second type corresponding to a document-based query type, and the third type corresponding to a pre-trained language model type, the pre-trained language model type associated with reliance on pre-trained data of the first language model;

generate, based at least in part on the classified type being either the first type or the second type, a target prompt being at least one of: a first prompt requesting conversion of the user query data into structured data, or a second prompt requesting identification of information related to the user query data based at least in part on context data, wherein a generation scheme of the target prompt being the first prompt or the second prompt is dependent on the classified type being the first type or the second type, respectively;

input the target prompt to a second language model;

identify few-shot data related to the user query data whose input frequency is greater than or equal to a reference number of times;

train the second language model based at least in part on the few-shot data;

receive response data transmitted from the second language model, the response data corresponding to the user query data;

display the response data to a user interface of the user terminal; and retrain the second language model based at least in part on the response data and the user query data to improve accuracy of future response data generated by the second language model.

2. The information provision device of claim 1, wherein the instructions are further configured to cause the processor to at least:

identify, in response to the classified type being the first type, a user query data conversion result obtained from the second language model that converts the user query data into a structured query language statement by inputting the first prompt to the second language model; and identify the response data by searching a database based at least in part on the user query data conversion result.

3. The information provision device of claim 2, wherein the instructions are further configured to cause the processor to at least input, upon identifying an error message from the second language model in response to converting the user query data into the structured query language statement, the user query data in which an error has occurred and error prompt data including the error message to the second language model.

4. The information provision device of claim 3, wherein the instructions are further configured to cause the processor to at least determine to provide the response data to the user based at least in part on the second prompt in response to identifying that the second language model is unable to convert the user query data into the structured query language statement.

5. The information provision device of claim 1, wherein the instructions are further configured to cause the processor to at least:

identify the context data related to the user query data in response to the classified type being the second type; and obtain the response data for the user query data from the second language model by inputting the second prompt including the context data to the second language model.

6. The information provision device of claim 5, wherein the instructions are further configured to cause the processor to at least update the context data in real time or periodically in a database.

7. The information provision device of claim 1, wherein the instructions are further configured to cause the processor to at least:

determine whether essential information is included in the user query data, the essential information corresponding to background or identifying information associated with the user query data; and include a pre-stored field value in the user query data in response to determining that the essential information is missing from the user query data.

8. The information provision device of claim 7, wherein the instructions are further configured to cause the processor to at least:

request the user terminal to input the essential information in response to determining that it is not possible to include a field value corresponding to the missing essential information in the user query data.

9. The information provision device of claim 1, wherein the instructions are further configured to cause the processor to at least:

determine whether essential information is included in the user query data, the essential information corresponding to background or identifying information associated with the user query data;

obtain, in case of determining that essential information is missing from the user query data, a field value for the missing essential information by using a pre-trained deep learning model; and include the field value in the user query data.

10. A computer-implemented method for processing user query data received from a user terminal, comprising:

receiving the user query data;

classifying a type of the user query data by using a first language model based at least in part on selecting between a first type, a second type, and a third type, the first type corresponding to a database inquiry type, the second type corresponding to a document-based query type, and the third type corresponding to a pre-trained language model type, the pre-trained language model type associated with reliance on pre-trained data of the first language model;

generating, based at least in part on the classified type being either the first type or the second type, a target prompt being at least one of: a first prompt requesting conversion of the user query data into structured data, or a second prompt requesting identification of information related to the user query data based at least in part on context data, wherein a generation scheme of the target prompt being the first prompt or the second prompt is dependent on the classified type being the first type or the second type, respectively;

inputting the target prompt to a second language model;

identifying few-shot data related to the user query data whose input frequency is greater than or equal to a reference number of times;

training the second language model based at least in part on the few-shot data;

receiving response data transmitted from the second language model, the response data corresponding to the user query data;

displaying the response data to a user interface of the user terminal; and retraining the second language model based at least in part on the response data and the user query data to improve the accuracy of future response data generated by the second language model.

11. The computer-implemented method of claim 10, further comprising:

identifying, in response to the classified type being the first type, a user query data conversion result obtained from the second language model that converts the user query data into a structured query language statement by inputting the first prompt to the second language model; and identifying the response data by searching a database based at least in part on the user query data conversion result.

12. The computer-implemented method of claim 11, further comprising inputting, upon identifying an error message from the second language model in response to converting the user query data into the structured query language statement, the user query data in which an error has occurred and error prompt data including the error message to the second language model.

13. The computer-implemented method of claim 12, further comprising determining to provide the response data to the user based at least in part on the second prompt in response to identifying that the second language model is unable to convert the user query data into the structured query language statement.

14. The computer-implemented method of claim 10, further comprising:

identifying the context data related to the user query data in response to the classified type being the second type; and obtaining the response data for the user query data from the second language model by inputting the second prompt including the context data to the second language model.

15. The computer-implemented method of claim 14, further comprising updating the context data in real time or periodically in a database.

16. The computer-implemented method of claim 10, further comprising:

determining whether essential information is included in the user query data, the essential information corresponding to background or identifying information associated with the user query data; and including a pre-stored field value in the user query data in response to determining that the essential information is missing from the user query data.

17. The computer-implemented method of claim 16, further comprising:

requesting the user terminal to input the essential information in response to determining that it is not possible to include a field value corresponding to the missing essential information in the user query data.

18. The computer-implemented method of claim 10, further comprising:

determining whether essential information is included in the user query data, the essential information corresponding to background or identifying information associated with the user query data;

obtaining, in case of determining that essential information is missing from the user query data, a field value for the missing essential information by using a pre-trained deep learning model; and including the field value in the user query data.

* * * * *